United States Patent [19]

Snyder

[11] 4,379,771
[45] Apr. 12, 1983

[54] METHODS OF AND APPARATUS FOR TERMINATING A LIGHTGUIDE FIBER RIBBON

[75] Inventor: Donald Q. Snyder, Marietta, Ga.

[73] Assignee: Western Electric Company, Inc., New York, N.Y.

[21] Appl. No.: 153,104

[22] Filed: May 23, 1980

[51] Int. Cl.³ .................. B29C 6/00; B29D 11/00; G02B 5/14
[52] U.S. Cl. .................. 264/1.5; 249/84; 249/85; 249/91; 249/219 R; 350/96.20; 425/110; 425/123; 425/808
[58] Field of Search .............. 264/1.5; 425/110, 808, 425/123; 249/84, 85, 91, 219 R; 350/96.20, 96.22

[56] References Cited

U.S. PATENT DOCUMENTS

| | | |
|---|---|---|
| 2,537,007 | 1/1951 | Abbott, Jr. |
| 3,055,786 | 9/1962 | Hendrix |
| 3,768,146 | 10/1973 | Braun |
| 3,864,018 | 2/1975 | Miller |
| 3,885,859 | 5/1975 | Dalgleish et al. |
| 4,029,390 | 6/1977 | Chinnock et al. |
| 4,046,454 | 9/1977 | Pugh |
| 4,049,414 | 9/1977 | Smith |
| 4,079,927 | 3/1978 | Rocton |
| 4,088,386 | 5/1978 | Hawk |
| 4,123,137 | 10/1978 | Marcatili |
| 4,146,301 | 3/1979 | Cherin |

OTHER PUBLICATIONS

A. H. Cherin et al., "Vacuum-Assisted Chip Multifiber Chuck", vol. 16, No. 6, Jun. 77, *Applied Optics*.
D. Q. Snyder, "Lightguide Connector Component Characterization", p. 209, Proceedings of International Wire & Cable Symposium, 11/79.
"Holding Fixture for Optical Fiber Array Connectors," Freeman et al., Western Electric Technical Digest No. 52, Oct. 78, pp. 7-8.

*Primary Examiner*—James B. Lowe
*Attorney, Agent, or Firm*—E. W. Somers

[57] ABSTRACT

In terminating a ribbon which comprises an array of lightguide fibers, a substrate having a plurality of parallel grooves is positioned in a nest and supported at its end portions after which an end portion of the ribbon is moved longitudinally to cause the fibers to be separated by a comb-like device adjacent one end of the nest after which the ribbon is secured with a clamp adjacent the other end of the nest. Another substrate having aligned grooves is placed over the fibers so that the fibers are held in channels formed by the opposing grooves after which the assembly of substrates and fibers are secured together with a temporary clamp which applies compressive forces to end portions of the assembly along a longitudinal centerline of the assembly. Then a vise which includes jaws having parallel surfaces for engaging the substrate is moved toward the assembly to position a lower jaw under the lower substrate and an upper jaw above the upper substrate. Further motion between the jaws is caused to clamp together the substrates and is controlled to avoid damage to the assembly. The temporary clamp is disengaged from the assembly and the vise is removed to an environment wherein heat transfer into the vise is caused so that a potting compound applied to the assembly fills the interstices thereof to bond together the substrates and fibers.

22 Claims, 16 Drawing Figures

Fig. 11

METHODS OF AND APPARATUS FOR TERMINATING A LIGHTGUIDE FIBER RIBBON

TECHNICAL FIELD

This invention relates to methods of and apparatus for terminating a lightguide fiber ribbon and, more particularly, for assembling a plurality of lightguide fibers of a ribbon with a pair of silicon chips.

BACKGROUND OF THE INVENTION

Lightguide fibers are now producible which in some applications compete favorably with other communication transmission media. This capability requires that economical splicing techniques be available for lightguide fiber systems. The splicing of fibers in an economic manner becomes an important problem to be overcome because the linking of two fibers require precise axial alignment and end separation. This becomes an even more acute problem in the splicing of a plurality of lightguide fibers of an array such as, for example, a fiber ribbon which may comprise twelve individual fibers. The problem in the mass splicing of a group of fibers is to position a first end of the array adjacent a similar end array so that corresponding fibers are all in precise axial alignment.

A method and means for splicing arrays of lightguide fibers is shown in U.S. Pat. No. 3,864,018 which issued on Feb. 4, 1975 in the name of C. M. Miller. Optical fibers are aligned in highly precise and duplicatable end arrays by a substrate, which is called a chip and which has spaced, parallel fiber-receiving grooves and ridges on top and bottom surfaces. An array of fibers are held in aligned, opposing grooves of two chips which are referred to as positive chips and which are presently made of a silicon material. The assembly of positive chips and fibers is potted to maintain the precision geometry of the array. A splice includes a butt joint of two such arrays which are aligned with respect to each other by so-called negative chips which span over the butted positive chips on each side of the assembly. The negative chips each have a plurality of grooves and ridges which are aligned with the ridges and the grooves of the adjoining positive chips. In this way, the ridges of the negative chips are received in the grooves of the positive chips to maintain the geometry. Clips are installed about the assembly to secure together the chips.

As should be expected, the groove geometry of the silicon chips is very important from the standpoint of controlling transmission loss. A discussion of the parameters of the chip which must be maintained within a one micron range is presented in an article by D. Q. Snyder entitled "Lightguide Connector Component Characterization" which was published at page 209 in the proceedings of the International Wire and Cable Symposium that was held on Nov. 13 through 15, 1979.

It should be apparent that methods and apparatus must be provided to facilitate the rapid fabrication of optical ribbon splices. A vacuum-assisted silicon-chip multiple fiber chuck which has been developed for assembling a plurality of lightguide fibers between a pair of the positive silicon chips is described in an article by A. H. Cherin et al entitled "Vacuum-Assisted Silicon Chip Multifiber Chuck" as published in Vol. 16 of *Applied Optics* in June 1977. The lightguide fibers are fanned out and moved into the grooves of one of the positive silicon chips after which the other chip is placed thereover and the assembly held together manually while it is potted.

What is still needed is the capability of assembling a plurality of lightguide fibers between two substrates to terminate a lightguide ribbon with assurance that the fibers are positioned within their respective grooves in the substrates during the assembly and that they will be retained within their respective grooves during the potting operation. This would facilitate field termination as well as allow the factory connectorization of lightguide fiber cable so that field personnel need only arrange the terminated ends of ribbons between negative chips and secure the chips together.

SUMMARY OF THE INVENTION

The capability of terminating a lightguide fiber ribbon is provided by this invention which includes methods of and apparatus for assembling a plurality of lightguide fibers with a pair of fiber-receiving substrates. A method of this invention for terminating a plurality of lightguide fibers which extend from a lightguide fiber ribbon includes the steps of supporting a first substrate at opposite end portions of the substrate in a nest at an assembly station, the substrate having a plurality of spaced parallel fiber-receiving grooves formed in at least one side thereof with the grooves oriented upwardly and spacing apart a plurality of lightguide fibers which extend from a lightguide ribbon beyond one end of the substrate with the ribbon extending beyond the opposite end of the substrate. Then the ribbon is moved in a direction along its longitudinal axis so that each of the individual fibers is pulled into and along one of the fiber-receiving grooves of the substrate after which a second substrate having a plurality of fiber-receiving grooves is positioned in engagement with the fibers with the grooves of the second substrate facing the grooves of the first substrate to enclose each of the fibers in a passageway formed between opposed aligned grooves in the first and the second substrates. Compressive forces are applied to the assembly of the first and second substrates and the plurality of lightguide fibers at end portions of the assembly above the supported end portions of the first substrate and substantially along a longitudinal center line of the substrates to hold together the assembly. One jaw of a vise is moved into juxtaposition with a lower surface of the first substrate and another jaw of the vise into juxtaposition with an upper surface of the second substrate after which the assembly is secured together by causing the jaws to apply a predetermined compressive force to the assembly. The application of the compressive forces to the end portions of the assembly is discontinued and an encapsulating material is applied to the assembly, said encapsulating material being adapted to fill interstices between the fibers and the substrates to hold together the assembly of the fibers and the substrates.

In a preferred embodiment, the method also includes the step of causing the first and second substrates to be laterally and longitudinally confined in said nest and prior to the step of applying an encapsulating material, the method includes the step of removing the lateral and the longitudinal confinement of the substrates. This facilitates a lowering of the nest out of supportive engagement with the assembly without unduly stressing the assembly.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
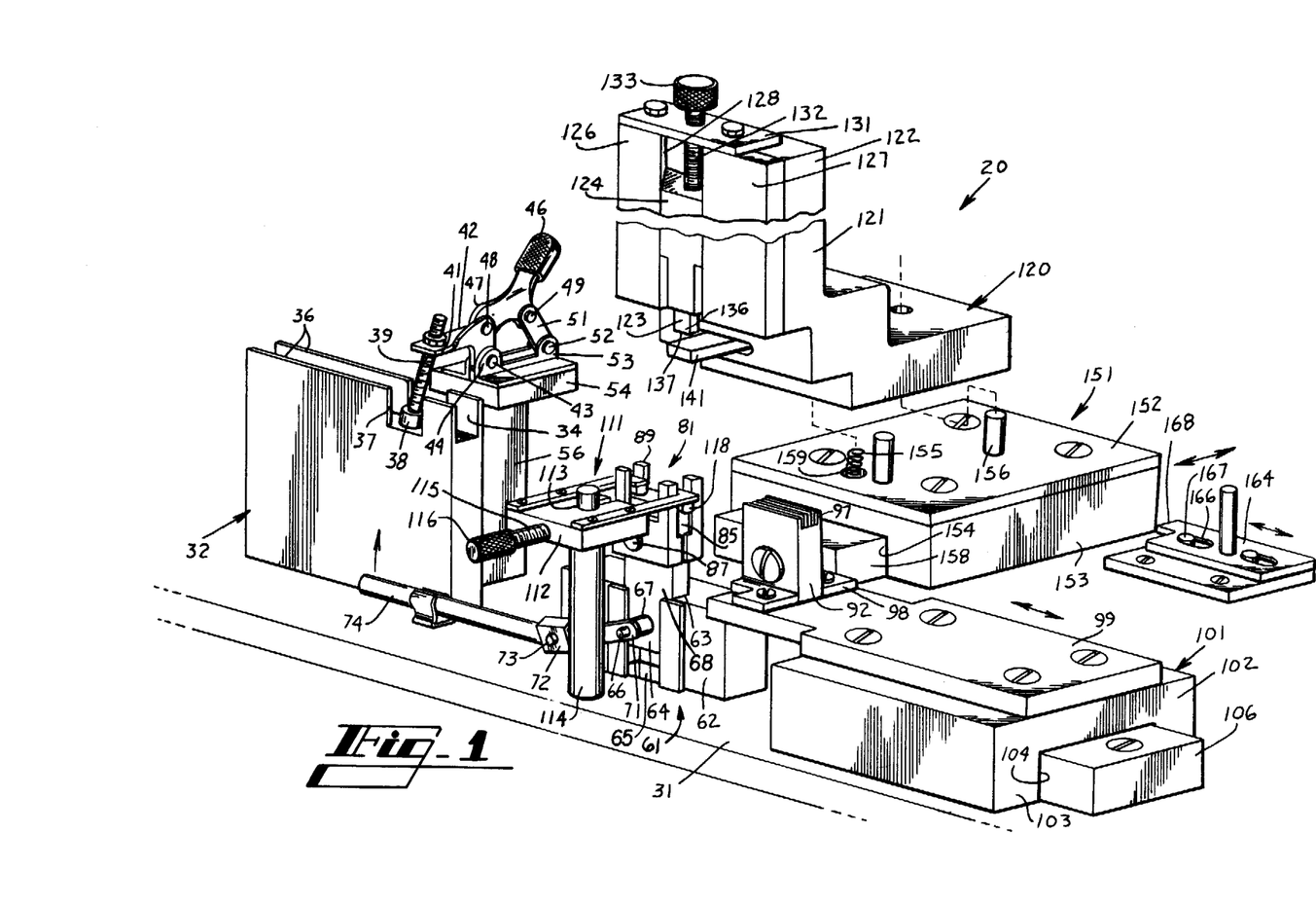
FIG. 1 is an overall perspective view of an apparatus of this invention for terminating a plurality of lightguide fibers.
Figure 2A:
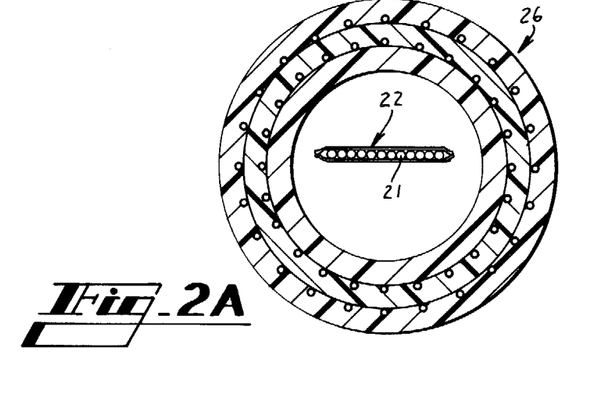
FIGS. 2A and 2B are end sectional views of lightguide fiber cables which are terminated by the methods and apparatus of this invention.

Referring now to FIG. 1, there is shown an apparatus 20 of this invention, said apparatus being capable of terminating a plurality of lightguide fibers 21—21 of an array 22 (see FIG. 2A) between a pair of positive substrates 23—23 (see FIG. 3) of a cable 26 or a cable 27. Each of the substrates 23—23 is a silicon chip which is referred to as a positive chip and which has been etched to produce a plurality of longitudinally extending, parallel grooves 24—24 having a precise geometrical configuration. A description of the geometry of the chips and their use in terminating lightguide fiber arrays is well described in the priorly identified article by D. Q. Snyder which was presented to the 1979 International Cable and Wire Symposium.

The apparatus 20 includes a base plate 31 having a support 32 for holding a lightguide fiber ribbon 22. The support 32 includes a channel 34 in which an assembly person positions the ribbon 22 with individual ones of the exposed fibers 21—21 extending beyond a right hand end of the channel as viewed in FIG. 4.

Side walls 36—36 of the support 32 which form the channel 34 have openings 37—37 formed therein for receiving a clamping pad 38 that is attached to one end of a threaded rod 39 that extends through an end 41 of a link 42 that is mounted pivotally by a pin 43 in a bearing 44. A clamping lever 46 has one end 47 pinned at 48 to the link 42 and is connected by a pin 49 to a link 51 that is connected by a pin 52 to a second bearing 53. The bearings 44 and 53 are mounted on an upper portion 54 of a stand 56 that is supported on the base plate 31.

Figures 3, 4, 5:
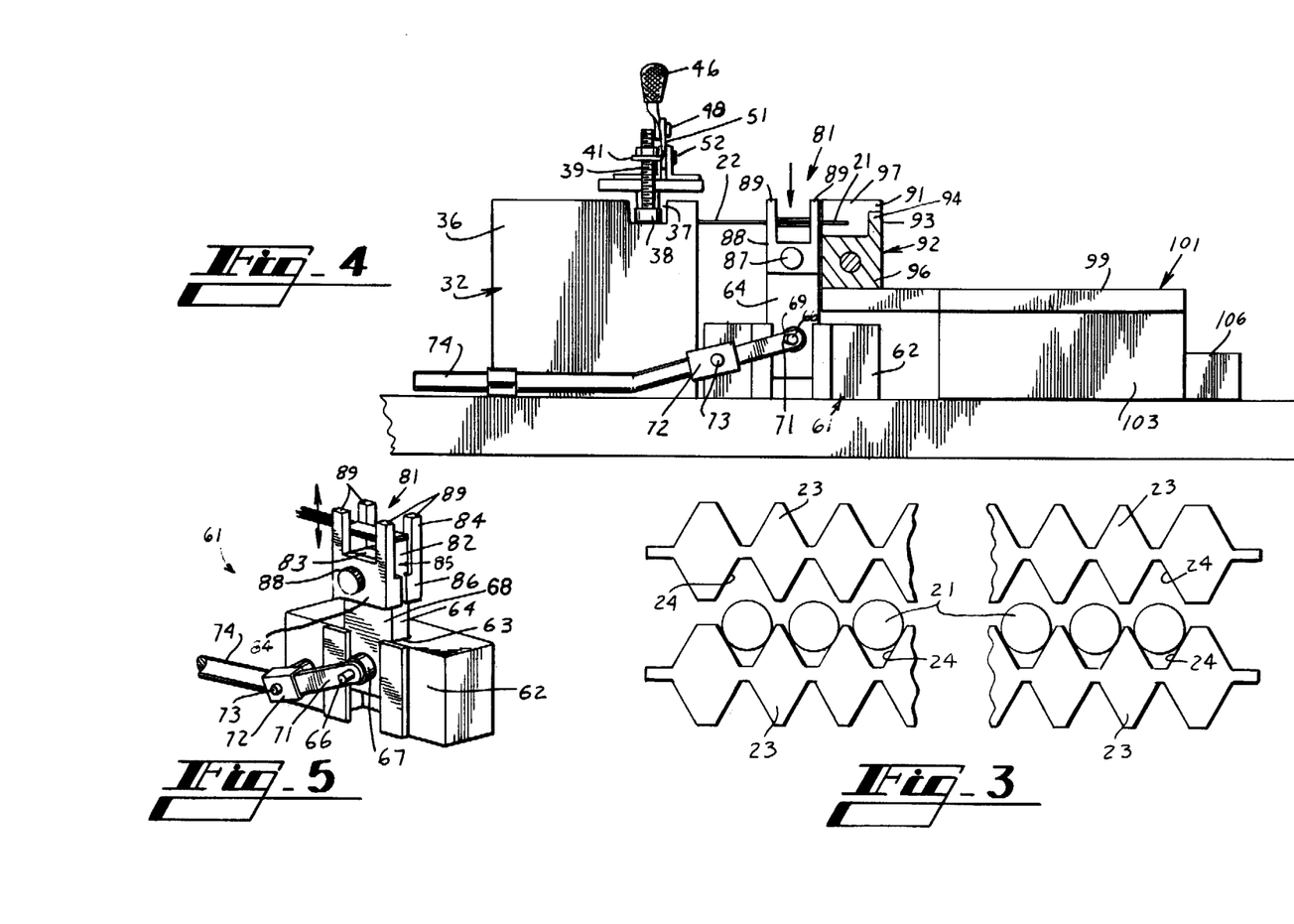
FIG. 3 is an enlarged cross-sectional view of an array of lightguide fibers which are disposed between a pair of silicon chips that have fiber-receiving grooves formed on each side thereof.
FIG. 4 is a side elevational view of the apparatus of FIG. 1.
FIG. 5 is an enlarged perspective view of a portion of the apparatus of FIG. 1 which includes a nest for holding an assembly of chips and fibers.

As can be seen in FIGS. 1, 4 and 5, a support, which is designated generally by the numeral 61, for a substrate 23 such as, for example, a silicon chip is positioned on the base plate 31 just to the right of the support 32. The support 61 includes a block 62 having a channel 63 formed therein and aligned with an opening 65 in the base plate 31. The channel 63 is adapted to have a post 64 mounted slidably therein. The post 64 has a pin 66 extending therethrough with a collar 67 mounted thereon adjacent a side 68 of the post. On the other side of the post 64, the pin 66 extends through a vertical slot in the block 62 and a generally horizontally disposed slot 69 in an ear 71 that extends from a plate 72 which is mounted rotatably on a shaft 73 that extends from the block 62. The ear 71 could just as well be mounted on the portion of the pin 66 adjacent the collar 67. The plate 72 has a handle 74 which is adapted to be moved to turn the plate 72 and cause the ear 71 to be turned to move the post 64 upwardly or downwardly.

Figure 6:
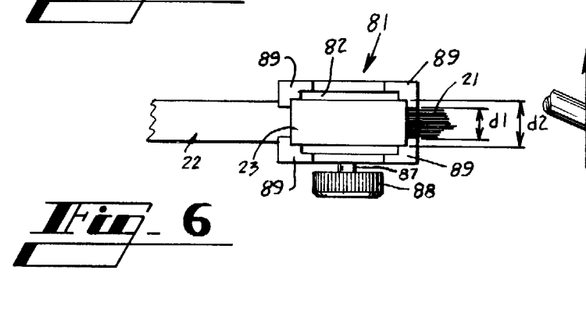
FIG. 6 is a top plan view of the nest of FIG. 5.

In order to provide a rack or nest 81 for a silicon chip 23, an upper portion 85 of the post 64 is generally U-shaped with end legs 82—82 upstanding from a horizontally disposed surface 83. Also, a pair of side plates 84—84 having overhanging portions 86—86 are mounted laterally of the post on a threaded fastener 87. The fastener 87 has a head 88 for turning the fastener to hold the side plates 84—84 in engagement with the post 64. It should be observed from FIG. 5 that each side plate is also U-shaped with a pair of spaced legs 89—89. The cross-sectional configuration of each of the legs 89—89 is stepped (see FIG. 6) such that an outer distance "$d_1$" between corresponding, opposing legs of the two side plates at their outer ends is less than an inner distance "$d_2$". This arrangement provides a nest for a silicon chip 23 and holds the chip while preventing inadvertent longitudinal movement through the engagement of corners of the chip with portions of the steps.

After an operator positions a lightguide ribbon 22 with the individual fibers 21—21 extending beyond the chip support 61, the fibers are fanned out between partitions 91—91 of a combing device which is designated generally by the numeral 92 (see FIG. 4). The partitions 91—91 are generally rectangular and maintained spaced apart by separators 93—93 which are L-shaped with an upstanding leg 94 connected to a horizontal portion 96. The horizontal portions 96—96 are spaced a substantially greater distance from the top edges of the partitions 91—91 than are the tops of the upstanding legs 94—94.

The partitions 91—91 are relatively thin blade-like pieces of polished steel which are alternated with the separators 93—93. Advantageously, the upstanding legs 94—94 of the separators 93—93 provide stability for the upper, generally unsupported portions of the partitions 91—91. The assembly of partitions and spacers are held between side plates 97—97 that extend upwardly from feet 98—98 that are attached to a top plate 99 of a slide 101. The slide 101 may be one which is commercially available from Design Components Inc. of Medfield, Mass.

The slide 101 is adapted to be moved slidably from left to right as viewed in FIG. 4 to initially position the comb adjacent to the chip support 61 to receive the fibers 21—21 between the partitions 91—91 and subsequently to be moved from the chip support to provide additional room about the nest 81 for additional operations. The slide 101 is U-shaped with a top portion 102 to which is attached the top plate 99 and depending side portions 103—103 to form a way 104 for a rail 106 that is mounted on the base 31. The rail 106 includes lateral V-shaped grooves 107—107 for holding roller bearings (not shown) between the rail and the depending side portions of the slide.

A temporary clamp 111 (see FIG. 7) is used to hold together the assembly until other facilities have been moved into position to perform that function. The temporary clamp 111 includes a main body portion 112 having a keyhole-shaped opening 113 formed therethrough so that the clamp can be mounted on a stepped post 114 that extends vertically upward from the base plate. A threaded pin 115 is turned into the body portion 112 by a knurled headed end 116 to cause its free end to enter the opening 113 and engage the post to lock the clamp to the post. The clamp 111 also has a pair of outwardly extending fingers 117—117 made of spring steel and having pads 118—118 attached to the ends thereof. The pads 118—118 are shaped to project toward each other and between the opposing uprights of the stand to engage the top positive chip. This of course applies compressive forces to end portions of the assembly which spans between end portions of the stand. Because of the material of which the fingers 117—117 are made and their dimensions, the pads 118—118 are self-adjusting and are not sensitive to the mounting of the body portion 112 on the post.

Figures 7, 8:
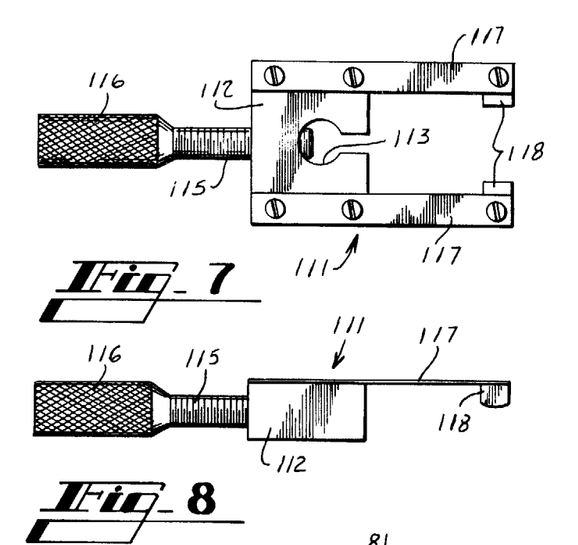
FIG. 7 is a top plan view of a device which is used to temporarily hold together an assembly of chips and fibers.
FIG. 8 is a side elevational view of the device shown in FIG. 7.

The temporary clamp 111 also is formed to insure that the application of compressive forces to the assembly of the chips 23—23 and fibers 21—21 is accomplished to avoid the inadvertent displacement of one or more of the fibers from their grooves. Such a displacement would occur if the forces were applied through surface-to-surface contact of the surfaces formed on the pads 118—118 with the top surface of the top chip 23. In order to avoid this and as shown in FIG. 8, the surfaces of the pads 118—118 are formed with a curvature to apply line contact forces to the top chip 23 at opposite ends of the top chip and generally along its longitudinal centerline.

If these last mentioned precautions were not taken and forces were applied through surface-to-surface rather than through line contact, the top chip 23 could become canted with respect to the lower chip which would cause the top chip to possibly become disengaged from one or more of the fibers 21—21. This would result in inadvertent lateral movement of the fibers 21—21 out of the grooves 24—24 in the bottom chip 23.

Figure 9:
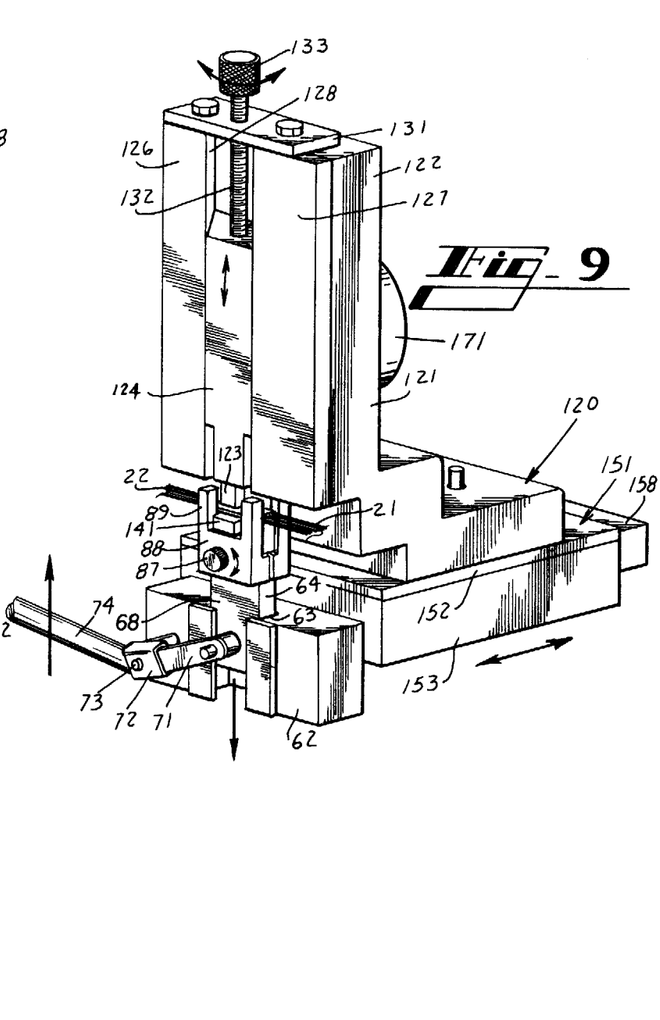
FIG. 9 is a perspective view of a vise which is mounted on a carriage that is adapted to be moved transversely of the ribbon.

After the assembly of the bottom silicon chip 23, lightguide ribbon 22 and top silicon chip 23 has been made, provisions are made for securing together the elements of the assembly in such a way that the secured assembly may be removed from the apparatus 20 and potted. A vise designated generally by the numeral 120 (see FIGS. 1 and 9) includes an L-shaped frame 121 having a stepped vertical leg 122. The clamping of the assembly is accomplished with a top clamp 123 which includes an upper portion 124 that has a trapezoidal cross-section with its longer base adjacent a vertical face of the frame 121. The portion 124 is adapted to be moved slidably between side guides 126 and 127 which are fastened to the frame 121 and which are tapered inwardly to form a way 128 that is adapted to receive the portion 124. A top member 131 spans across the guides 126 and 127 and has a threaded rod 132 extending therethrough and turned into the portion 124. A torque limiting thumbwheel 133 is attached to the upper end of the rod 132 to allow an operator to cause the portion 124 to be moved upwardly or downwardly.

A lower portion 136 of the top clamp 123 has a jaw 137 that is adapted to clamp the assembly between it and a lower jaw 141. The lower jaw 141 comprises an insert 145 (see FIG. 10) that is supported in a U-shaped opening 142 of an arm 143 that is cantilevered out from a T-shaped plate that is secured to an underside of the frame 121.

The thumbwheel 133 and rod 132 arrangement for moving the jaw 137 toward the lower jaw 141 is force limiting which results in slippage between the rod and the thumbwheel 133 after a predetermined torque has been applied to the rod when the two jaws are in engagement with each other. This arrangement prevents the application of unduly high compressive forces to the assembly of the chips 23—23 and the fibers 21—21.

Care is taken in order to insure that the upper and lower jaws 137 and 141 of the vise 120 are substantially parallel to each other. Initially, the insert 145 is set in a bed of epoxy resin within the arm 143 and the upper jaw moved downwardly into compressive engagement with it. A set screw 146 is moved upwardly through the T-shaped plate 143 forcing the insert 145 into planar engagement with the upper jaw 137. This engagement is maintained until the epoxy resin cures whereupon the upper jaw is moved upwardly leaving its face substantially parallel to that of the insert 145.

The vise 120 is adapted to be mounted on a carriage designated generally by the numeral 151 so that it may be moved transversely toward or spaced from the chip support 61. The carriage 151, which may be one such as the slide 101 which is available from Design Components, Inc., includes a top plate 152 that is attached to a U-shaped portion 153 having an opening 154 therethrough. The top plate 152 includes two spaced pegs 156—156 which are adapted to be received in the apertures in the foot of the L-shaped frame of the vise 120. Inner side walls of the U-shaped portion 154 which form the opening 154 include longitudinally extending grooves into which project roller bearings that are mounted in adjacent side walls 157—157 of a guide rail 158 that is received within the opening 154.

Again referring to FIG. 1, it can be seen that a compression spring 155 is received in an opening 159 in the top plate 152. This spring 155 extends into an alinged opening at the lower portion of the vise 120. As the vise 120 is moved with the carriage 151 inwardly toward the nest, the spring 155 is such that the vise base is spaced slightly above the top plate of the carriage 151, but also such that the lower jaw 141 may be moved under the lower chip. The spring 155 is effective to counteract the vise weight and is effective to counter the downward forces exerted against the vise when the thumbwheel 133 is turned to cause the upper jaw to be moved toward the lower jaw.

The apparatus 20 also includes provisions for precisely positioning the vise 120 so that its jaws 137 and 145 underlie and overlie the chip assembly. An adjustable stop 161 extends laterally of the block 62 a predetermined distance so that when it engages a front side of the U-shaped portion 154 of the carriage 151, the jaws of the vise are positioned above and below the chip assembly. Further, a slide 164 having two slotted openings 166—166 is mounted for sliding movement transverse of the direction of motion of the carriage 151. Fasteners 167—167 extend through the openings 166—166 into the base plate and allow the slide to be moved to position a latch 168 to be moved behind the U-shaped portion 153 to retain the carriage 151 in its forward, clamping position while its jaws are being engaged with the chip assembly.

In the termination of a single ribbon 22, a positive chip 23 is positioned in the nest 81 supported in engagement with the surface 83 and with its corners in engagement with the steps of the legs 89—89. Then the ribbon 22 with end portions of the fibers 21—21 exposed is positioned in the channel 34 with the end portions of the fibers disposed between the partitions 91—91 of the comb 92 which is positioned adjacent the chip support 61 as shown in FIG. 4. The ribbon 22 is pulled to the left as viewed in FIG. 4 to cause the fibers 21—21 to be moved between the partitions 91—91 and into the grooves 24—24 of the lower chip 23. The ribbon 22 is clamped in the channel 34 and a visual check is made to determine that all fibers 21—21 are seated individually within their respective grooves 24—24. Then the upper chip 23 is positioned over the fibers 21—21 such that the fibers are received in its grooves and such that the corners of the chip are in engagement with the stepped legs 89—89. The comb 92 is moved to the right as viewed in FIG. 4 to space it from the chip support 61 to provide access for checking the seating of each fiber 21 between two grooves 24—24 and to provide additional room for subsequent operations.

The temporary clamp 111 is mounted on the post 114 and lowered until the pads 118—118 which protrude between opposing pairs of legs 89—89 engage the ends of the upper chip 23 at its ends. Because of the curvature of their lower surfaces, the pads 118—118 apply line contact compressive forces to the assembly of chips 23—23 and fibers 21—21 generally along a longitudinal axis of the assembly and at end portions of the assembly over the top of the legs 82—82 on which the assembly is supported. The knurled headed end 116 is turned to cause the temporary clamp 111 to be attached to the post 114 such that the compressive engagement of the pads 118—118 with the assembly is maintained.

Next, the carriage 151 is moved unitl it engages the stop 161 which causes the jaws 137 and 141 of the vise 120 to be positioned above and below the assembly in the nest 81. Since the assembly is supported as a beam between the legs 82—82 of the U-shaped center section of the nest 81, the lower jaw 141 of the vise 120 is capable of being moved under the assembly. The thumbwheel 133 is turned to cause the upper jaw 137 to be moved downwardly to clamp the assembly between it and the lower jaw. As should be apparent, this clamping of the assembly is accomplished between the pads 118—118 of the temporary clamp 111.

After the vise 120 has been caused to clamp together the assembly, the temporary clamp 111 is removed from engagement with the upper substrate 23. The head 88 is turned to loosen the engagement of the side plates 84—84 with the U-shaped center plate 85 and with the assembly. When the handle 74 is moved clockwise as shown in FIG. 4 to lower the nest 81, the release of the side plates 84—84 permits the disengagement of the chip support 61 from the assembly without stressing the assembly. The ribbon 22 remains in the channel 34 and the assembly supported and held clamped in the vise 120.

The assembly of chips 23—23 and fibers 21—21 is now ready to be potted with an epoxy resin material. The pad 38 is caused to be disengaged from the ribbon 22 and the vise 120 together with the ribbon is removed from the apparatus 20. The vise 120 is placed in engagement with a heating device (not shown) such as a hot plate to cause heat transfer into the jaws 137 and 141 and into the assembly. The vise 120 may be constructed with a short length of rod 171 made of a material having a relatively high thermal heat conductivity to facilitate heat transfer into the vise. After a predetermined temperature is reached, an epoxy resin material is applied to the chips 23—23 and is caused to flow into and fill the interstices between the fibers 21—21 and the walls of the grooves 24—24. The assembly is then moved to another work station where its free end is ground and polished to facilitate field or factory connectorization.

Figure 2B:
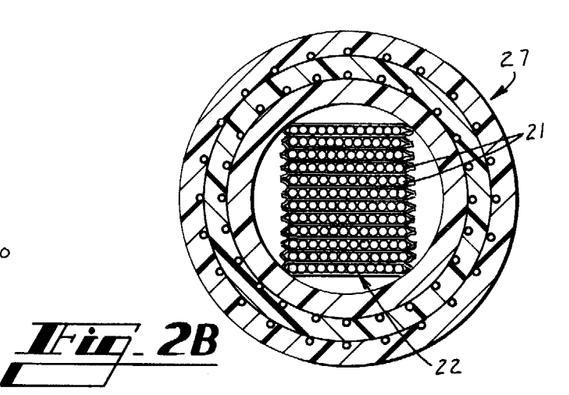

The above-described embodiment is used to terminate a simple lightguide fiber ribbon which generally comprises twelve fibers. The apparatus 20 may be modified as shown in FIGS. 11 and 12 to include a different ribbon clamp and a different temporary clamp than those used in the above-described embodiment so that it can be used to terminate a stack of ribbons 22—22. First, turning to facilities for clamping a cable 27 (see FIG. 2B) having an array of ribbons, a ribbon clamp designated generally by the numeral 201 which comprises part of the modified apparatus as shown in FIG. 13 and includes a pair of side plates 202—202 spaced apart by a base 203 and a rod 204.

Each of the plates 202—202 is formed with a pair of arcuately shaped slots 206 and 207 with the slots 206—206 and 207—207 being aligned. The slots 206 and 207 are adapted to receive pins 208—208 and 209—209 that extend laterally of a clamping finger 211 having a hooked end 212. The finger 211 includes a frontal pad 213 that is adapted to engage a top portion of the array of stacked ribbons when the array is received in the channel. A lower portion of the finger 211 is bifurcated with a shaft 214 extending between those portions. A tension spring 216 has one end secured to the shaft 214 and a lower end secured to a shaft 217 that extends between the side plates adjacent to the base.

The slots 208—208 and 209—209 are arranged and configured so that an operator must apply downward and horizontal forces to the hooked end 212 to cause the pins 208—208 and 209—209 to be moved in the slots 206—206 and 207—207 to the lowermost portions of the slots. When the clamp is in that position, the spring 216 holds the pad 213 in engagement with the array. To disengage the pad 213 from the array, the operator pulls the hooked end rearwardly and upwardly to cause the pins to move along their respective slots and become locked in the rear portions thereof.

Figures 10, 12, 13, 14:
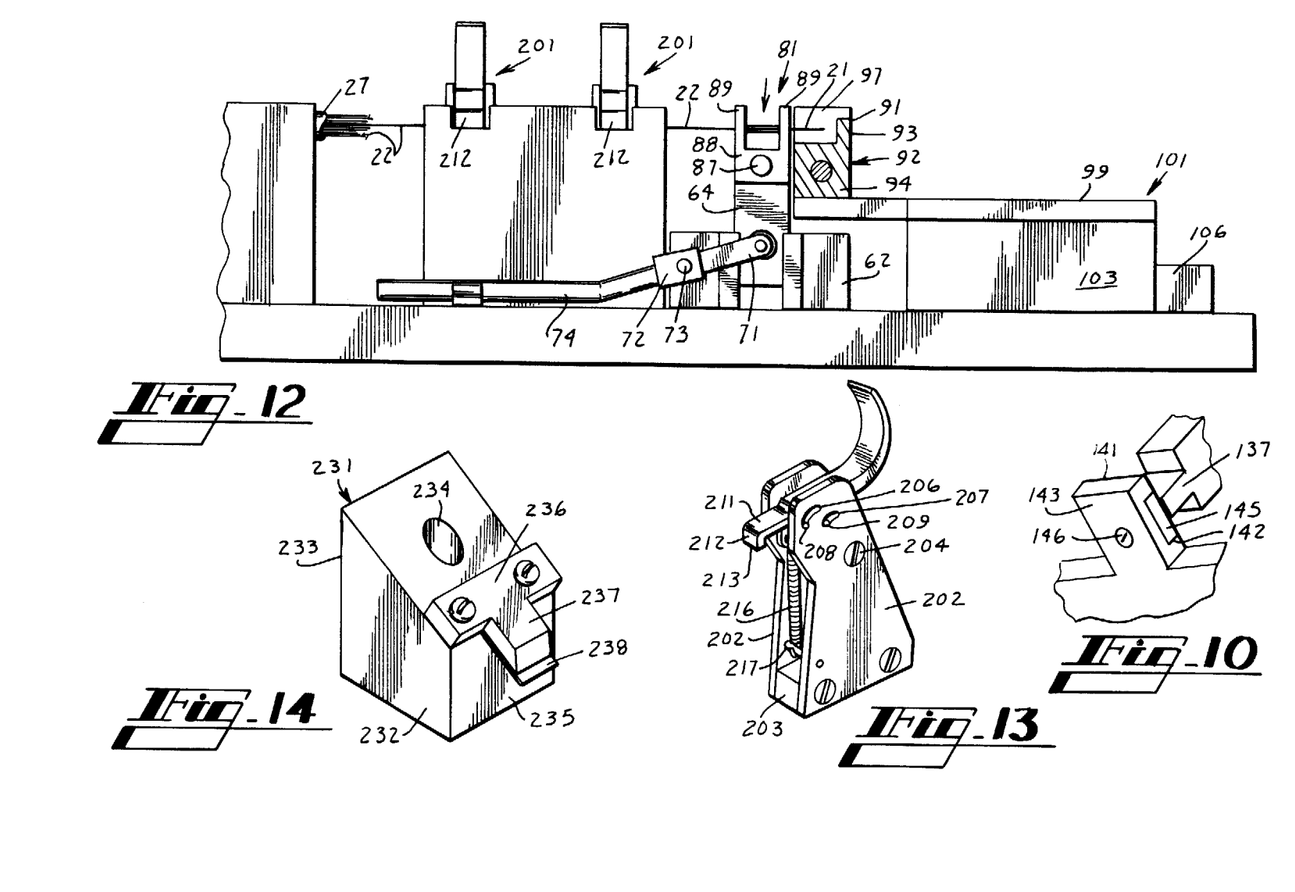
FIG. 10 is an enlarged perspective view of upper and lower jaws of the vise shown in FIG. 9.
FIG. 12 is a side elevational view of the apparatus of FIG. 11.
FIG. 13 is an enlarged perspective view of one of the ribbon clamps of the apparatus of FIG. 11.
FIG. 14 is an enlarged perspective view of a portion of the apparatus of FIG. 11 which is used to secure together ones of the chips and fibers as they are being assembled in the nest.
Figure 11:
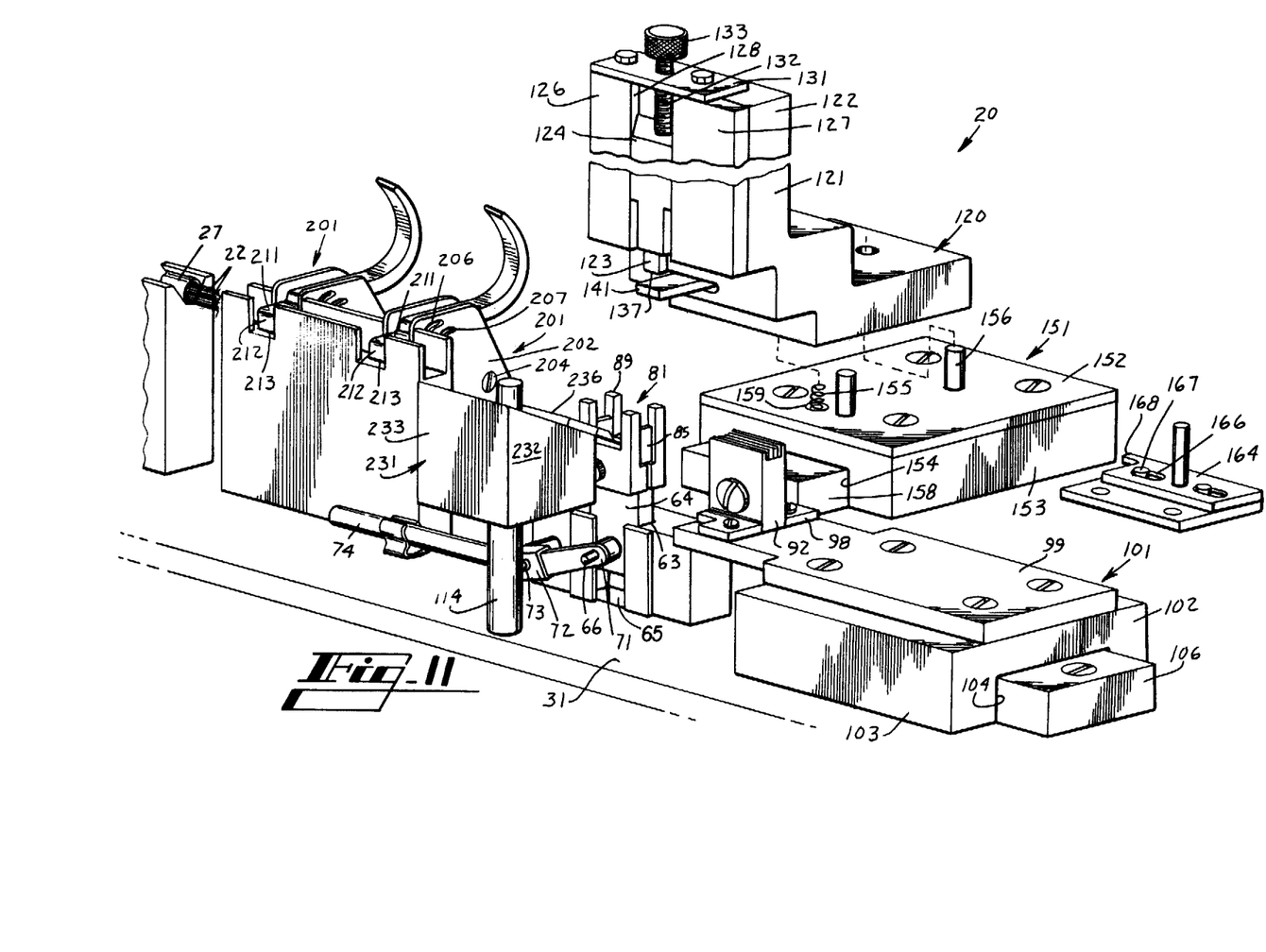
FIG. 11 is a perspective view of another embodiment of this invention which is used to terminate each ribbon of lightguide fibers of a stack of ribbons of the cable shown in FIG. 2B.

Going now to facilities for temporarily clamping the array, there is shown in FIG. 14 a device 231 that comprises a block 232 having one end 235 that is lower than another end 233. An opeing 234 is formed vertically through the block so that the block can be mounted on the post 114 upstanding from the base plate. A T-shaped clamping member 236 is attached to the inner end of the block with the stem 237 of the T projecting toward the stack of ribbons 22—22 and chips 23—23. A spring-like finger 238 is attached to the underside of the stem. As each ribbon is moved donwardly into the nest into superimposed relation to foregoing chips and ribbons, it deflects the spring-like finger and the block 232 is indexed to successively higher positions on the post 114.

In the use of the modified apparatus 20 for terminating a stack of ribbons 22—22 of a cable 27, a chip 23 is positioned in the nest 81 spanning between the upper surfaces of the legs of the U-shaped center section 85 and then one ribbon of the stack is terminated as described hereinbefore for the single ribbon. Of course, now the ribbon clamps 201—201 are used to engage the stack. After the lowermost ribbon has been terminated between a lower chip 23 and an upper chip, the grooves in the upper surface of the upper chip become starting grooves for the next successive ribbon in the stack. After all the ribbons 22—22 in the stack have been terminated, the assembly of chips and fibers is clamped by the vise 120 as before and removed for potting.

Figure 15:
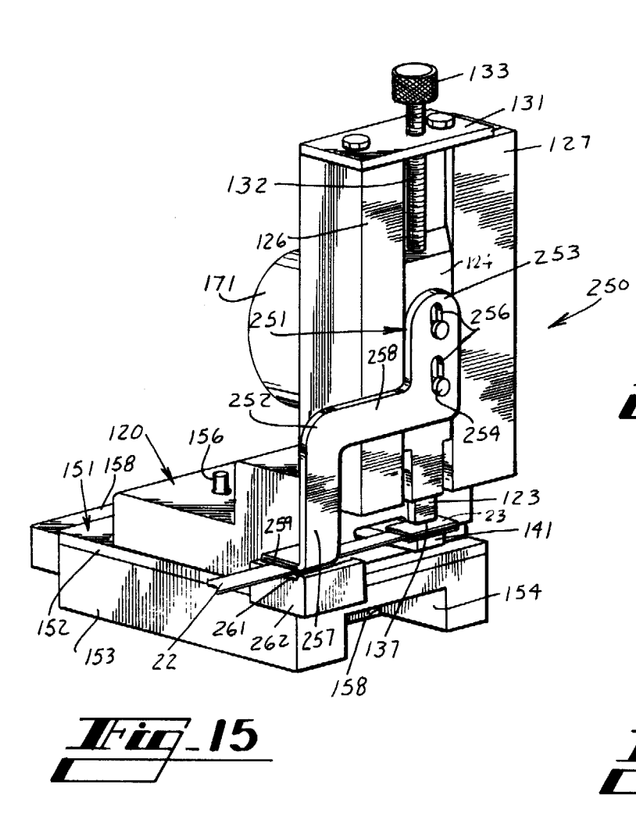
FIG. 15 is a perspective view of apparatus for holding the ribbons adjacent the silicon chips.

Turning now to FIG. 15 there is shown another embodiment of the vise 120. A vise designated generally by the numeral 250 includes all the elements of the vise 120 but also includes an auxiliary clamp 251. The clamp 251 includes an arm 252 having an upper portion 253 which is supported from two fasteners 254—254 that extend through slotted openings 256—256 in the upper portion and into the moveable post of the vise. A lower portion 257 of the clamp 251 depends downwardly from a horizontal portion 258 and includes a pad 259 designed to cooperate with a lower pad 261 supported from a cantilevered arm 262. The pads 259 and 261 are made of a rubber-like material.

The clamp 251 is designed to have its pads 259 and 261 engage portions of the ribbon 22 having its fibers 21—21 extending into the nest. In this way when the vise 250 is removed from the apparatus for the potting step, undue flexing of the ribbon of fibers in the assembly is prevented thereby avoiding possible cracking of the fibers at their entrance to the chips 23—23.

The foregoing methods of this invention have been described to include the step of removing the vise 120 with the assembly of substrates and fibers clamped between the jaws of the vise to another work station where a potting compound is applied to fill the interstices between the fibers and the grooves. It should be realized that in some applications, the disengaging of the nest 81 from supportive engagement of the assembly by lowering of the nest allows sufficient space about the assembly as held in the vise to perform the potting operation.

It is to be understood that the above-described arrangements are simply illustrative of the invention. Other arrangements may be devised by those skilled in the art which will embody the principles of the invention and fall within the spirit and scope thereof.

What is claimed is:

1. A method of terminating a plurality of lightguide fibers which extend from a lightguide fiber ribbon, said method comprising the steps of:

supporting opposite end portions of a first substrate in a nest at an assembly station, the substrate having a plurality of spaced parallel fiber-receiving grooves formed in at least one side thereof with the grooves oriented upwardly;

spacing apart a plurality of lightguide fibers which extend from a lightguide ribbon beyond one end of the substrate with the ribbon extending beyond the opposite end of the substrate;

moving the ribbon in a direction along its longitudinal axis so that each of the individual fibers is pulled into and along one of the fiber-receiving grooves of the substrate;

positioning a second substrate having a plurality of fiber-receiving grooves in engagement with the fibers with the grooves of the second substrate facing and being aligned with the grooves of the first substrate to enclose each of the fibers in a passageway formed between opposed aligned grooves in the first and second substrates;

applying compressive forces to the assembly of the first and second substrates and the plurality of lightguide fibers at end portions of the assembly above the supported end portions of the first substrate and substantially along a longitudinal center line of the substrates to hold together the assembly;

moving one jaw of a vise into juxtaposition with a lower surface of the first substrate and another jaw of the vise into juxtaposition with an upper surface of the second substrate;

securing together the assembly by causing the jaws to apply predetermined compressive forces to the assembly betweeen the end portions of the assembly;

discontinuing the application of the compressive forces to the end portions of the assembly;

disengaging the nest from supportive engagement of the assembly; and causing an encapsulating material to fill interstices between the fibers and the substrates to hold together the assembly of the fibers and the substrates.

2. The method of claim 1, which also includes the step of causing the first and second substrates to be laterally and longitudinally confined in said nest and prior to the step of applying an encapsulating material, the method includes the step of removing the lateral and the longitudinal confinement.

3. The method of claim 1, which also includes the step of clamping the lightguide ribbon at a point spaced from the substrates.

4. The method of claim 1, which is used to terminate a cable comprising a stack of a plurality of ribbons, said method including the step of clamping the stack at spaced points which are spaced from the substrates.

5. The method of claim 2, which also includes the steps of moving the nest downwardly to discontinue its support of the substrates, and then the step of moving the assembly and the vise to another work station where the encapsulating material is applied.

6. The method of claim 1, wherein said vise is caused to apply forces to the substrates through two parallel planar surfaces, said planes caused to be parallel by the steps of setting one of said planar surfaces in a bed of a curable adhesive material and causing the other of said planar surfaces to be moved downwardly into compressive engagement with the one surface prior to the curing of the adhesive so that the two surfaces are in substantial engagement with each other.

7. The method of claim 1, which also includes the step of causing heat transfer into said vise after said vise and said assembly have been removed from the assembly station to the other work station but before the application of the encapsulating material.

8. An apparatus for terminating a plurality of lightguide fibers which extend from a lightguide ribbon, said apparatus comprising:
- a nest for supporting a first substrate at opposite end portions of the substrate, the substrate having a plurality of spaced parallel grooves with the grooves being oriented upwardly;
- means disposed adjacent one end of said nest and aligned with said nest for receiving a longitudinal end portion of a lightguide ribbon with the individual lightguide fibers extending therefrom and past the other end of said nest;
- means disposed adjacent the other end of said nest for separting the lightguide fibers by spacing apart said individual lightguide fibers to facilitate the receipt of the fibers extending past said nest in the grooves formed in the first substrate and in aligned grooves of a second substrate, the first substrate having been positioned in said nest prior to said fibers being extended through said nest, and the second substrate being positioned in engagement with the fibers to enclose each of the fibers in a passageway formed between opposed aligned grooves;
- means for applying compressive forces to the assembly of said substrates and said lightguide fibers at opposite ends of the assembly and along a longitudinal centerline thereof above the supported end portions of the first substrate to hold the assembly securely in said nest;
- a vise which includes a lower jaw for engaging a lower surface of the first substrate and an upper jaw for engaging an upper surface of the second substrate, said vise including means for causing relative motion between said jaws to controllably apply compressive forces to the assembly; and
- means mounting said vise for movement along a path of travel transverse of the fibers to facilitate said lower jaw being moved beneath the first substrate between the supported end portions of the first substrate and said upper jaw being moved above the second substrate.

9. The apparatus of claim 8, said apparatus also including
- means mounting said nest for vertical reciprocal movement; and
- means for moving said nest in a vertical direction.

10. The apparatus of claim 9, said apparatus also including means engaging end portions of the substrates for confining said assembly when said assembly is supported in said nest to prevent inadvertent lateral and longitudinal movement of the substrates, said means including means for releasing the engagement of said confining means with the substrates to facilitate the vertical movement of said nest and its discontinuance of support of the assembly.

11. The apparatus of claim 10, wherein said nest includes a U-shaped center section having a horizontal portion and two upstanding legs, said legs of said U-shaped section being designed to hold the first substrate above an upwardly facing surface of the horizontal portion of the U-shaped section to facilitate the movement of said lower jaw of said vise between said upwardly facing surface of said horizontal portion of said U-shaped section and the first substrate.

12. The apparatus of claim 11, wherein said nest also includes a pair of outer cover plates releasably mounted in engagement with opposite sides of said U-shaped section, each of said outer cover plates including a pair of spaced upstanding legs which extend above the ends of said legs at said U-shaped section, the first substrate being supported on and spanning between upper ends of said legs of said U-shaped section and being prevented from inadvertent lateral and longitudinal movement of said legs of said cover plates.

13. The apparatus of claim 12, wherein each of said legs of said cover plate has a stepped cross-section to provide a distance between opposed portions of opposing legs of said pair of cover plates adjacent an end of the nest which is smaller than the distance between corresponding portions adjacent an inner portion of said nest.

14. The apparatus of claim 8, wherein said means for applying compressive forces includes means disposed adjacent a side of said nest opposite from said vise and adapted to engage opposed ends of the assembly in said nest for holding the assembly together in said nest temporarily while the jaws of said vise are moved into engagement with the assembly, said means for holding the assembly in said nest temporarily being capable of being disengaged from the assembly to discontinue the application of compressive forces to the assembly after said vise has been engaged with the assembly.

15. The apparatus of claim 8, which also includes means for moving said means for separating said fibers to a position spaced from said nest after the fibers have been positioned in said grooves of the substrates.

16. The apparatus of claim 8, wherein said separating means includes a plurality of relatively thin blade-like members in a parallel array, with adjacent ones of said members being spaced apart by a separator, each said separator being L-shaped with a horizontal portion of each L-shaped separator being a greater distance below a top edge of said adjacent blade-like members than an upstanding portion of each L-shaped member.

17. The apparatus of claim 8, wherein said vise includes an L-shaped frame and a rod-like member extending from a portion of the frame, the rod-like member being made of a material having a relatively high coefficient of thermal heat conductivity, said vise being used to transfer heat energy into the assembly to facilitate the flow of a potting compound into interstices between the fibers and the grooves in the substrates.

18. The apparatus of claim 8, wherein said vise includes a lower jaw being set in a bed of a cured adhesive and an upper jaw, said jaws having opposing surfaces which are parallel.

19. The apparatus of claim 8, wherein said vise includes means for causing said upper jaw to be moved toward said lower jaw to apply compressive forces to the assembly, said means including means for limiting the compressive forces which are applied to the assembly to prevent damage to the assembly.

20. The apparatus of claim 19, said apparatus also including compressible means disposed between said vise and said means for mounting said vise so that when said upper jaw of said vise is moved toward said lower jaw and causes compressive forces to be applied to the assembly, the vise is capable of being deflected slightly downwardly to control the application of the compressible forces to the assembly.

21. The apparatus of claim 11, which is used to terminate a plurality of ribbons in a stack, said apparatus including a spring-like finger and means for mounting said finger adjacent said nest so that as each ribbon is terminated between the substrates, the assembly is held in engagement with end supports of the U-shaped section by said finger.

22. The apparatus of claim 21, wherein said apparatus includes a pair of spaced clamps for engaging the stack of ribbons.

* * * * *